United States Patent

[11] 3,534,837

[72] Inventors Otto Bergander and Peter Geibel, Schweinfurt, Germany
[21] Appl. No. 749,831
[22] Filed Aug. 2, 1968
[45] Patented Oct. 20, 1970
[73] Assignee Fichtel & Sachs A.G. Schweinfurt, Germany
[32] Priority Aug. 23, 1967
[33] Germany
[31] 1,625,713

[54] CLUTCH ARRANGEMENT
8 Claims, 2 Drawing Figs.
[52] U.S. Cl. .................................................. 192/48.8, 192/70.18, 192/70.29
[51] Int. Cl. ........................................................ F16d 21/02, F16d 13/22
[50] Field of Search .......................................... 192/70.17, 70.18, 70.29, 70.27, 70.3, 48.8—48.91

[56] References Cited
UNITED STATES PATENTS

| | | | |
|---|---|---|---|
| 2,229,910 | 1/1941 | Adamson et al. ............. | 192/70.17 |
| 3,017,003 | 1/1962 | Reed ............................. | 192/70.27 |
| 3,170,551 | 2/1965 | Cook............................. | 192/70.17UX |

Primary Examiner—Mark M. Newman
Assistant Examiner—Allan D. Herrmann
Attorney—Low and Berman

ABSTRACT: A friction disc clutch disengageable by means of release levers is provided with a power takeoff having a tubular drive shaft coaxially receiving the clutch shaft and a coupling disc on the drive shaft. Screws connect peripheral nuts on the coupling disc with bosses projecting from the cover toward the clutch input member between the release levers, the screws being nearer the clutch axis than the lever pivots so that the coupling disc does not interfere with the release mechanism. Sufficient space is available to equip the coupling disc with a flexible center.

INVENTORS
Otto Bergander
Peter Geibel
By: Low and Berman
Agents

CLUTCH ARRANGEMENT

BACKGROUND OF THE INVENTION

This invention relates to automotive clutch arrangements, and particularly to a friction clutch arrangement equipped with a power takeoff for driving auxiliary equipment.

Clutch arrangements of the type described are being used in self-propelled cement mixers and similar industrial trucks. The secondary drive shaft of the power takeoff in a known arrangement is coaxial with the clutch shaft and is coupled to the pressure plate of the friction clutch by a flange, radial arms, and leaf springs approximately tangential to a circle about the clutch axis. The springs of necessity are attached to the inner rim of the annular pressure plate, leaving so little space for the coupling arrangement that an effective vibration damping device cannot be interposed between the pressure plate and the secondary drive shaft. The leaf springs are relatively ineffective for this purpose.

Because the torque required for turning a cement mixer varies cyclically as the cement mix rolls in the mixer drum, the drive shaft is subjected to strong vibrations. When the clutch is disengaged, rather severe cyclic stresses are thereby generated in the elements which fasten the pressure plate to the clutch cover, and the useful life of the known clutch arrangement may be significantly reduced by premature failure of these elements.

An object of the invention is the provision of a clutch arrangement of the general type described in which the structural elements of the clutch proper are not unfavorably affected by operation of the power takeoff. A concomitant object is the provision of such an arrangement which is simple and rugged, and thus reliable.

With these and other objects in view, as will become apparent hereinafter, the invention provides an improved connection between the flange or coupling disc on the secondary drive shaft and the driving portion of the clutch. Fasteners fasten the coupling disc to the clutch cover for joint rotation so as to prevent relative angular movement of the coupling disc as a whole and of the cover.

The fastening members which are operatively interposed between the coupling disc and the clutch cover are arranged nearer the axis of rotation of the clutch than the pivots which secure the circumferentially spaced levers of the clutch release mechanism to the clutch cover so that the fastening arrangement does not interfere with operation of the release mechanism. Interference is further avoided by the provision of bosses on the clutch cover in the clutch housing to which internally threaded members peripherally arranged on the coupling disc are fastened by screws, the levers and their pivots being angularly interposed between the screws and the bosses relative to the clutch axis.

Other features, additional objects, and many of the attendant advantages of this invention will readily be appreciated as the same becomes better understood by reference to the following detailed description of a preferred embodiment when considered in connection with the appended drawing.

DESCRIPTION OF THE PREFERRED EMBODIMENT

Figure 1:
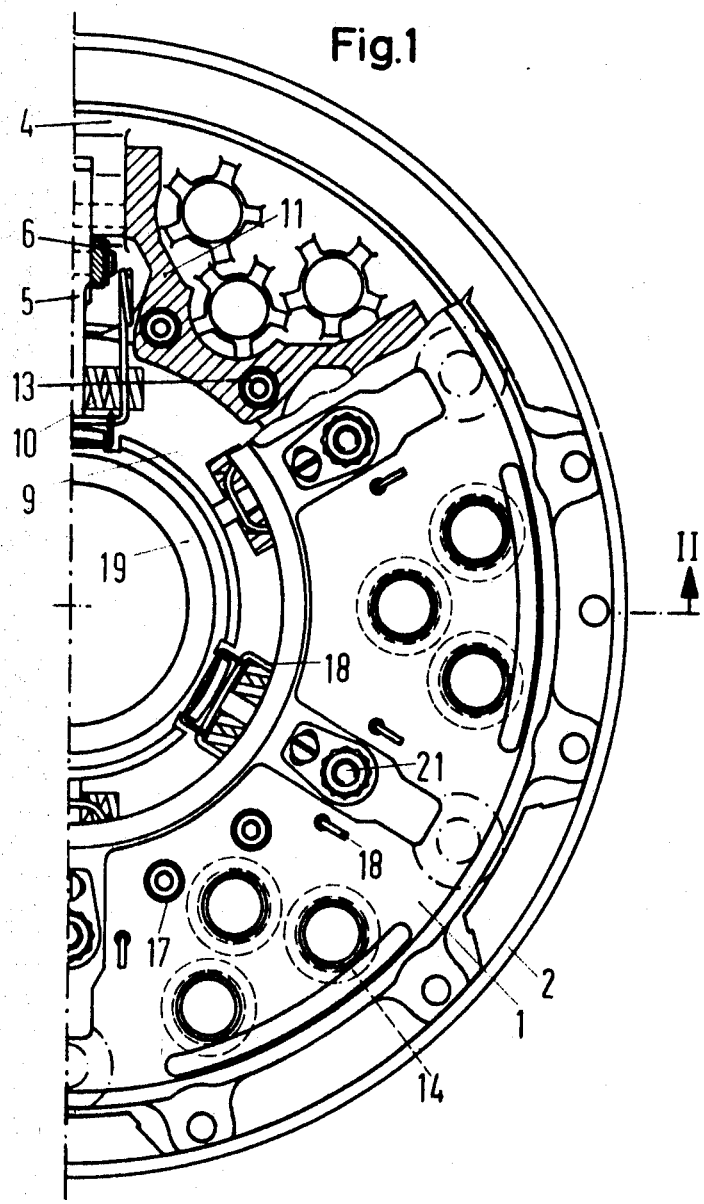
FIG. 1 shows one of the two symmetrical halves of a clutch arrangement of the invention in rear elevation, the output shafts and some associated elements being omitted, and the clutch cover being partly broken away to reveal internal structure.
Figure 2:
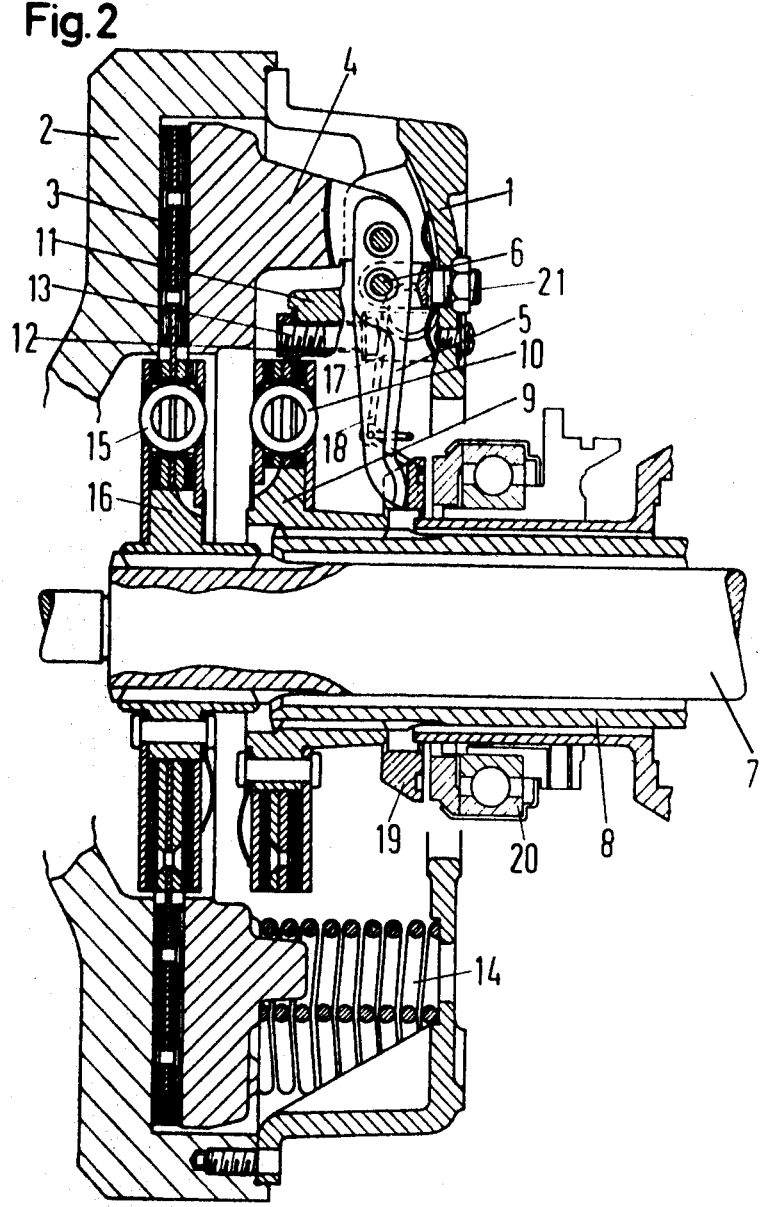
FIG. 2 shows the apparatus of FIG. 1 in section on the line II-II.

The drawing shows a basically conventional automotive friction clutch equipped, according to this invention, with a power takeoff for use in a self-propelled cement mixer or similar truck.

The driving portion of the clutch includes the flywheel 2 of the associated internal combustion engine, which is the input member of the clutch, and a clutch cover 1 bolted to the flywheel to form a clutch housing therewith. An annular pressure plate 4 is mounted on the cover 1 and biased toward the flywheel 2 in the clutch housing by 18 helical compression springs 14. In the engaged position of the clutch shown in the drawing, flat radial contact faces of the flywheel 2 and of the pressure plate 4 engage therebetween a clutch disc 3 which is splined to the clutch shaft 7, the disc and shaft constituting the principal elements of the driven clutch portion.

The clutch disc 3 has a conventional flexible center equipped with helical compression springs 15 which permits limited relative movement of the hub 16 of the disc 3 and of the annular peripheral disc portion in order to absorb torsional vibrations.

A tubular secondary shaft 8, which is the drive shaft of the power takeoff, is coaxially rotatable on the clutch output shaft 7. Its front end carries a coupling disc 9 whose hub portion is splined to the drive shaft 8 and carries vibration absorbing helical compression springs 10 in an arrangement substantially identical with the flexible center portion of the disc 3. Instead of an annular plate covered with friction facings, the flexible center of the coupling disc 9 carries peripheral lugs to which nuts 12 are welded.

Three bosses 11 integrally project from the clutch cover 1 in a radially inward and axially forward direction in circumferentially spaced relationship. Bores in the bosses 11 are accessible in recesses 17 in the rear wall of the cover 1. Screws 13 extend from each recess into an aligned nut 12 through bores in the bosses 11, thereby fixedly fastening the peripheral portion of the coupling disc 9 to the clutch housing 1, and thereby to the flywheel 2.

The clutch disc 3 may be released from engagement with the contact faces of the pressure plate 1 and the flywheel 2 by six clutch release levers 5 equiangularly distributed about the clutch axis between the bosses 11. Each lever 5 is pivoted on a pin 6 attached by an eye bolt 21 to a portion of the clutch casing 1 offset from the screws 13 in a radially outward direction. A short arm of the lever 5 extends radially outward for hinged engagement with the pressure plate 4. The longer lever arm terminates near the tubular shaft 8. Wire torsion springs 18 are hooked into openings in the cover 1 and into a clutch release ring 19 and hold the ring against the inner ends of the levers 5.

A throwout bearing 20, operated by a conventional fork, not shown, slides axially on the tubular shaft 8 toward and away from the ring 19. When the ring 19 is shifted forward together with the long arms of the levers 5, the short lever arms withdraw the pressure plate 4 from the disc 3 to disengage the clutch.

As is evident from the drawing, the secondary drive shaft 8 and coupling disc 9 are attached to the rotating clutch elements in such a manner that the coupling disc 9 does not interfere with the clutch release mechanism. Still, its radial dimensions are sufficient to provide ample space for the flexible center including the springs 10 which prevents transmission of cyclic stresses from the drive shaft 8 to the clutch.

The assembly of the clutch arrangement is easily accomplished by attaching the nuts 12 to the bosses 11 by means of the screws 13 introduced from the readily accessible recesses 17 before the shafts 7,8 are inserted in the discs, 3,9. This condition of the clutch arrangement is seen in FIG. 1.

The clutch arrangement illustrated is operated in a conventional manner not requiring further explanation. The shaft 8 is the first element of a power train which connects the coupling disc 9 to the cement mixer drum in a manner not directly relevant to this invention, and not further shown.

We claim:

1. In a clutch arrangement having a driving clutch portion including an input member rotatable about an axis, a cover fastened to said input member and defining a clutch housing therewith, a pressure plate secured in said housing to said cover, and yieldably resilient means axially biasing said pressure plate toward said input member; a driven clutch portion including a clutch shaft rotatable about said axis, and a clutch disc mounted on said clutch shaft axially intermediate said pressure plate and said input member; clutch release means including a plurality of clutch release levers pivotally mounted on said housing for simultaneous engagement with said cover and said pressure plate, and pivoting means for pivoting said levers and for thereby moving said pressure plate away from said input member; a secondary drive shaft; a coupling disc secured on said secondary drive shaft against rotation; and connecting means drivingly connecting said coupling disc to one of said clutch portions, the improvement in said connecting means which comprises fastening means fixedly fastening said coupling disc to said cover for joint rotation about said axis and preventing relative angular movement of said coupling disc and said cover.

2. In an arrangement as set forth in claim 1, said coupling disc having a hub portion secured on said secondary shaft against angular displacement, a peripheral portion fixedly fastened to said cover by said fastening means, and vibration damping means connecting said hub portion to said peripheral portion for damping transmission of torsional vibration by said coupling disc between said secondary shaft and said cover.

3. In an arrangement as set forth in claim 1, said levers being secured to said cover by respective pivots, said fastening means including a plurality of fastening members each engaging said coupling disc and said cover, said fastening members being nearer said axis than said pivots.

4. In an arrangement as set forth in claim 3, said levers being angularly interposed between said fastening members relative to said axis.

5. In an arrangement as set forth in claim 3, said fastening means including a plurality of fixed bosses axially projecting from said cover toward said input member in said housing, each of said fastening members fixedly fastening one of said bosses to said coupling disc.

6. In an arrangement as set forth in claim 5, a plurality of internally threaded members peripherally arranged on said coupling disc in circumferentially spaced relationship, said fastening members threadedly engaging said internally threaded members.

7. In an arrangement as set forth in claim 5, said pivots being angularly interposed between said bosses relative to said axis.

8. In an arrangement as set forth in claim 6, said secondary shaft being coaxial with said clutch shaft, said coupling disc having a hub portion secured on said secondary shaft against angular displacement, a peripheral portion carrying said internally threaded members, and flexible center means connecting said hub portion to said peripheral portion for damping transmission of torsional vibration by said coupling disc between said secondary shaft and said cover.